United States Patent [19]
Miyamoto et al.

[11] Patent Number: 5,149,253
[45] Date of Patent: Sep. 22, 1992

[54] MAGNET PUMPS

[75] Inventors: Eiji Miyamoto, Tokyo; Yoshinori Ojima, Kanagawa; Tadashi Yakabe, Kanagawa; Toshiya Kanamori, Kanagawa, all of Japan

[73] Assignee: Ebara Corporation, Tokyo, Japan

[21] Appl. No.: 533,405

[22] Filed: Jun. 5, 1990

[30] Foreign Application Priority Data

Jun. 5, 1989 [JP] Japan .................................. 1-141175
Jun. 8, 1989 [JP] Japan .................................. 1-144033
May 15, 1990 [JP] Japan .................................. 2-123133

[51] Int. Cl.$^5$ ............................................ F04D 13/06
[52] U.S. Cl. ..................................... 417/353; 417/372; 417/420; 310/86; 310/156
[58] Field of Search ............... 417/352, 353, 368, 372, 417/371, 420, 355; 310/156, 86

[56] References Cited

U.S. PATENT DOCUMENTS

| | | | |
|---|---|---|---|
| 3,194,165 | 7/1965 | Sörlin | 417/353 |
| 3,291,056 | 12/1966 | Steinman | 417/368 |
| 3,867,655 | 2/1975 | Stengel et al. | |
| 4,806,080 | 2/1989 | Mizabuchi et al. | 417/353 |

FOREIGN PATENT DOCUMENTS

| | | |
|---|---|---|
| 0240674 | 10/1987 | European Pat. Off. |
| 2058062 | 9/1979 | Fed. Rep. of Germany |
| 62-40054 | 2/1987 | Japan |
| 62-165596 | 7/1987 | Japan |
| 62-284995 | 12/1987 | Japan |

OTHER PUBLICATIONS

Patent Abstracts of Japan, unexamined applications, M field, vol. 5, No. 72, May 14, 1981, The Patent Office Japanese Govt., p. 136 M68, Kokai-No. 56-23 592 (Yazaki).

Patent Abstracts of Japan, unexamined applications, M field, vol. 11, No. 114, Apr. 10, 1987, The Patent Office Japanese Govt., p. 121 M 579, Kokai-No. 61-258 992 (Mitsubishi).

Primary Examiner—Richard A. Bertsch
Assistant Examiner—David W. Scheuermann
Attorney, Agent, or Firm—Oblon, Spivak, McClelland, Maier & Neustadt

[57] ABSTRACT

A magnet pump in which an impeller having a permanent magnet embedded therein is rotatably driven by a magnetic force from the outside of the impeller is disclosed. The pump comprises a pump casing including a suction port, a discharge port and a pumping chamber in which the impeller is contained. The impeller is rotatably contained in the pumping chamber of the casing and has the permanent magnet embedded therein. A pair of bearings, one being fixed to the casing and the other being fixed to the impeller is provided. A magnetic force driving mechanism constitutes a means for affording the magnetic force on the permanent magnet within the impeller to rotatably drive the latter. The magnetic force driving mechanism is mounted on a non-liquid-contacting portion of the casing at a position facing the impeller in respect to the direction of the rotary shaft axis of the impeller. A fluid inlet passage for communicating between the suction port and the pumping chamber is formed to pass through the center portion of the magnetic force driving mechanism.

16 Claims, 9 Drawing Sheets

MAGNET PUMPS

BACKGROUND OF THE INVENTION

1. Field of the Invention

This invention relates to a so-called magnet pump in which an impeller having a permanent magnet embedded therein is rotatably driven by a magnetic force from the outside and, particularly, to a magnet pump adopting an axial gap type magnetic force transmitting mechanism in which a magnet embedded in an impeller is rotatably driven by a magnetic force from a permanent magnet or stator provided in a position spaced therefrom in the direction of the rotary shaft axis of the impeller, and in which the liquid-contacting portion has a simple structure which is suitable for pumping and circulating various chemicals.

2. Prior Art

Figure 6:
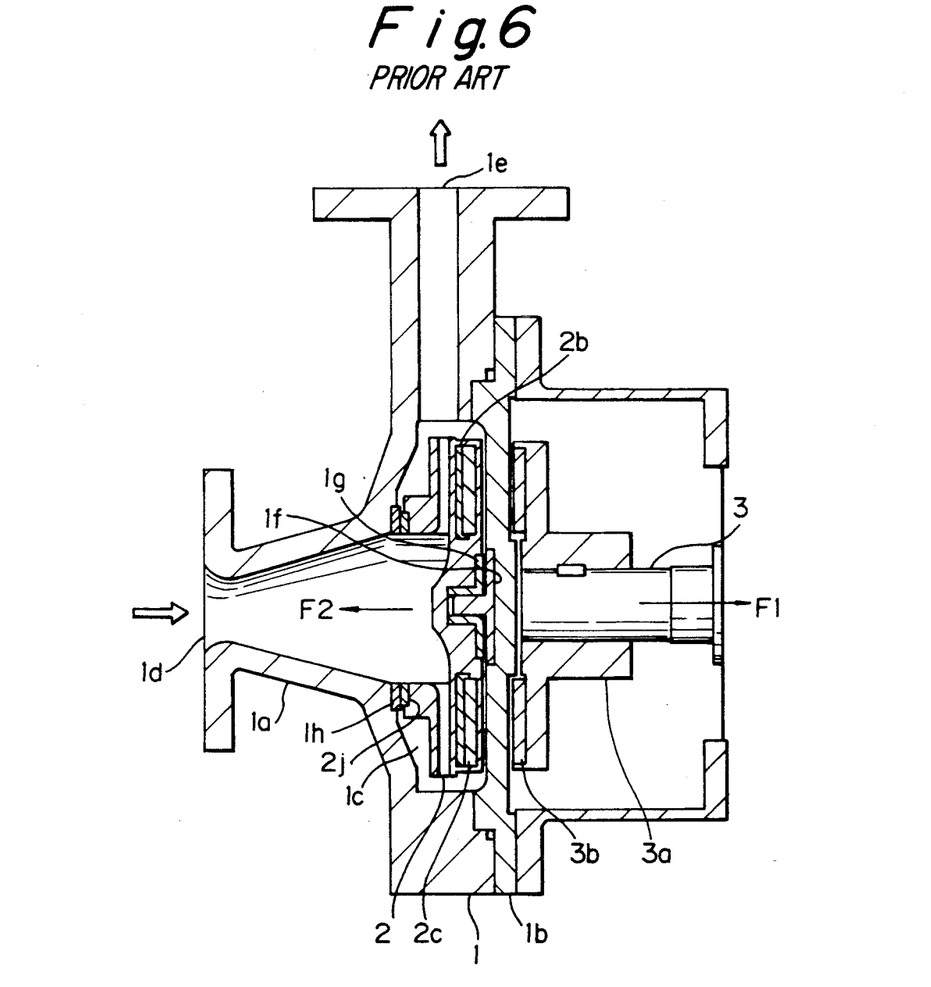
FIG. 6 is a vertical sectional view showing a conventional magnet pump.
Figure 7:
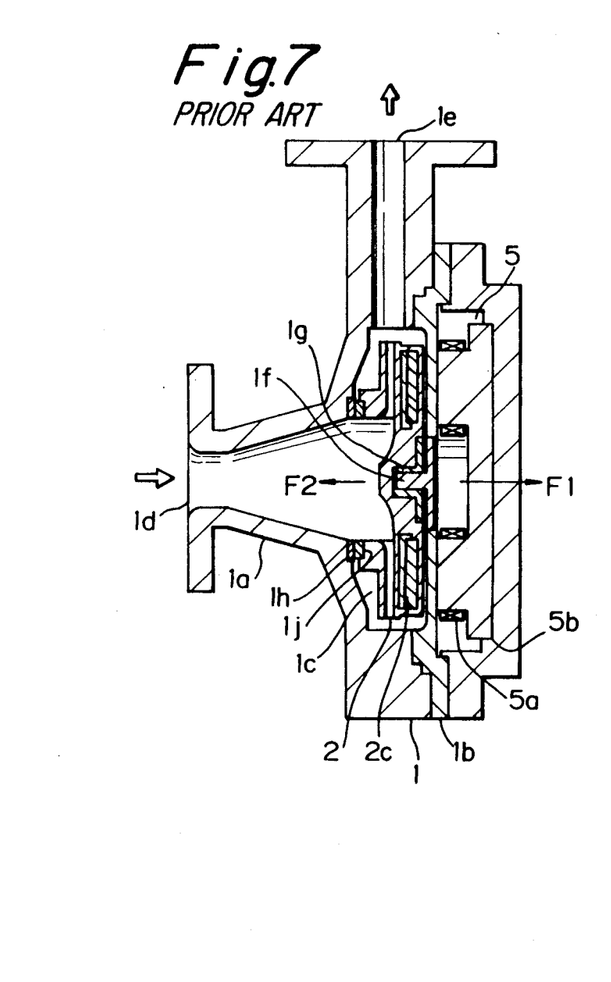
FIG. 7 is a vertical sectional view of another conventional magnet pump.

Typical examples of such a magnet pump are shown in FIGS. 6 and 7. The magnet pump shown in FIG. 6 is adapted to rotatably driven the pump impeller utilizing the magnet coupling between permanent magnets and the pump comprises a pump casing 1 including an inlet cover 1a joined to a back cover 1b and including a pump chamber 1c containing the impeller 2, a suction port 1d for introducing fluid to be pumped and a discharge port 1e for discharging the pressurized fluid. The back cover 1b is provided on its non-liquid-contacting portion with a magnet yoke 3a fixed to a main shaft 3 rotatably driven by a drive source, such as a motor (not shown), and a permanent magnet 3b is annularly provided on a surface of the magnet yoke 3a opposing the back cover 1b. An annular permanent magnet 2c is embedded in a similarly annular magnet yoke 2b within the impeller 2 which is rotatably contained in the pumping chamber 1c, and the impeller 2 is rotatably driven by the main shaft 3 to displace the fluid. The annular permanent magnet 2c and permanent magnet 3b may be formed in a single ring-like permanent magnet or of a plurality of annularly arranged permanent magnets. In any case, on the mutually opposed surfaces of the respective permanent magnets 2c and 3b, the N- and S-poles should be alternately and circumferentially arranged. The force acting on the impeller 2 when it is not moved is mainly the magnetic attraction force F1 of the permanent magnets 2c, 3b and thus the impeller 2 is urged towards the back cover 1b and the pump is activated in such a condition. Therefore, the back cover 1b is provided on its side with a fixing-part bearing 1f and the impeller 2 also on its back surface with a rotating-part bearing 1g to thereby support the thrust and radial loads.

With respect to the bearing for supporting the impeller for rotation, a slide member on the rotating part (bearing 1g) and a slide member on the fixed part (bearing 1f) are each referred to as a bearing and a pair of such slide members also to simply be referred to as a bearing herein.

Figure 6A:
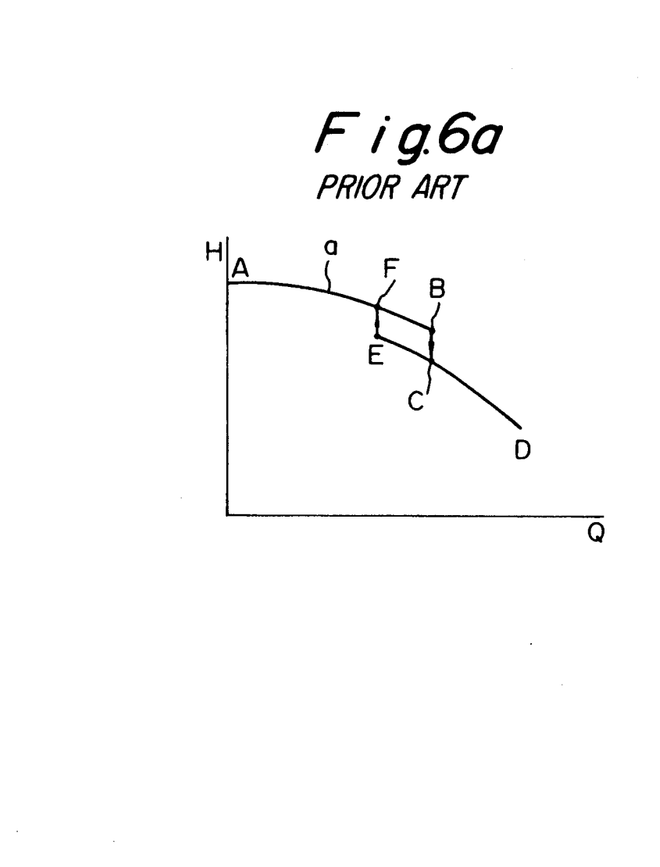
FIG. 6(a) is the pressure-flow rate characteristic curve of the conventional magnet pump.

In FIG. 6, the arrow indicating the magnetic attraction force F1 acting on the impeller 2 does not exactly indicate where the force acts upon, but merely shows a component of the magnetic attraction force in the direction of the rotary shaft axis. As the impeller 2 rotates, the fluid is pressurized and the fluid pressure acts as a thrust force F2 for urging the impeller 2 towards the inlet side. Thus, the inlet cover 1a is provided with a fixed-part bearing 1h, and a rotating-part bearing 2j is provided on a part opposing the bearing 1h of the impeller 2. The strength of the magnetic attraction force F1 generated by the permanent magnets 2c, 3b varies due to the fluid force applied to the impeller 2, and the magnitude of the thrust force F2 also varies due to the fluid pressure. A case in which the pump impeller is rotating at a constant speed will now be explained with reference to the pressure-flow rate characteristic curve shown in FIG. 6(a) of which the ordinate H is the pump discharge pressure and the abscissa Q is the pump flow rate. Since the centrifugal pump as shown in FIG. 6 normally starts with the outlet valve closed off, the pump operating point is the point A, and when the outlet valve is gradually open, the pump operating point moves along the solid line a to the point B. Between the points A and B, the pump impeller 2 rotates, while it is subjected to a thrust force F2 which is larger than the magnetic attraction force F1, and urged towards the inlet cover 1a. At the point B, the magnetic attraction force F1 and the thrust force F2 are equal to each other, and as the valve is further opened the magnetic attraction force F1 becomes larger than the thrust force F2 and the impeller 2 rotates while urged towards the back cover 1b (point C). At point C, the impeller 2 is rotating at a position spaced away from the inlet cover 1a and therefore the bearing clearance between the high and lower pressure regions becomes sufficiently large to allow the pressurized fluid to escape to the suction portion thereby reducing the pump outlet pressure below the point B. When the valve is opened still further, the pump operating point moves along the solid line to the point D. When the valve then gradually closes the pump operating point moves to the point E through the point C since the magnetic attraction force F1 is larger than the thrust force F2. At point E, the magnetic attraction force F1 and the thrust force F2 are equal to each other. When the valve is opened further the impeller 2 rotates while being urged by the thrust force F2 towards the inlet cover 1a and the operating point reaches the point F. In this manner, according to the magnet pump of FIG. 6, the pump pressure-flow rate characteristics curve depicts a hysteresis curve, and accordingly the impeller 2 rotates while biased either towards the inlet cover 1a or towards the back cover 1b depending upon the operating condition, as described above.

A further conventional magnet pump shown in FIG. 7 is adapted to directly rotatably drive the magnet embedded in the impeller with the electromagnetic force generated by the stator. The basic structure of the casing 1 and impeller 2 is the same as those of the conventional pump shown in FIG. 6, but it differs in that the driving magnetic force mechanism constituting the means for rotatably driving the impeller 2 is a stator 5. The stator 5 for driving the magnet embedded in the impeller is mounted on the non-liquid-contacting portion of the back cover 1b at a position opposing the magnet of the impeller, the stator 5 having coils 5a wound on an annularly arranged core 5b, the coils 5a being supplied with power from a power source control circuit not shown, thereby rotatably driving the impeller 2 on the operating principle of a so-called brushless motor. The magnet pump of FIG. 7 also exhibits similar behavior on the characteristic curve to those of the pump of FIG. 6 described above, and the impeller 2 rotates while based either towards the inlet cover 1a or towards the back cover 1b depending upon the pump operating condition.

In the aforementioned magnet pumps, the impeller 2 is, in operation, shifted in the direction of the rotary shaft axis 20 thereof depending upon the operating condition. Namely, in respect to the axial force acting on the impeller 2, there are operating regions, i.e., an operating region (A→B, F→A on the characteristic curve) in which the resultant force of the magnetic attraction force F1 acting between the permanent magnet 2c embedded in the impeller 2 and the driving-part permanent magnet 3b (or stator 5) for rotatably driving it and the thrust force F2 due to the fluid acting on the impeller is directed towards the inlet cover 1a, an operating region (C→D, D→E) in which the resultant force is reversely directed towards the back cover 1b, and an unstable region (B→C, E→F) which is the transient region between the operating regions, and the position of the impeller may vary depending upon the pump operating conditions in various ways. Upon such an axial shift of the impeller 2, an impact load is applied to the bearing and, since the impeller is then rotated with eccentricity at a corresponding speed, uneven contact occurs on the sliding surface of the bearing which causes damage. Such a phenomenon creates problems, particularly when air bubbles are contained in the fluid to be pumped. Namely, when fluid containing air bubbles is pressurized under the action of the centrifugal force of the impeller 2, the discharge pressure widely varies and accordingly the thrust force F2 caused by the fluid pressure also varies. Thus, the impeller 2 is vibrated in the axial direction, which can cause undesirable pump vibration and the possibility of bearing failure. In the aforementioned prior art examples, moreover, bearings are provided in the respective positions on the sides of the inlet cover 1a and back cover 1b and these bearings must be assembled parallel or perpendicular to each other and this causes problems in the machining and assembling processes of the parts.

In the case that extremely high purity fluid is to be delivered without being contaminated, an easily damageable bearing involves the risk of bearing debris entering into such a fluid, and if a special surface treatment such as a corrosion resistance is applied to the bearing, the layer of surface treatment may be peeled off; these represent potentially serious problems which are likely to occur even if the pump is well maintained.

SUMMARY OF THE INVENTION

It is an object of the present invention to provide a magnet pump in which various axial forces acting on the impeller are directed in one direction to eliminate any unstable motion of the impeller.

It is another object of the invention to provide a magnet pump suitable for delivering a high purity fluid without causing any contamination.

To attain the above-mentioned objects, according to the present invention, there is provided a magnet pump in which an impeller having a permanent magnet embedded therein is rotatably driven by a magnetic force from the outside of the impeller, the magnet pump comprising a pump casing including a suction port, a discharge port and a pumping chamber in which the impeller is contained; the impeller being rotatably contained in the pumping chamber of the casing and having the permanent magnet embedded therein; a pair of bearings, one being fixed to the casing and the other being fixed to the impeller; a magnetic force driving mechanism constituting a means for affording the magnetic force on the permanent magnet within the impeller to rotatably drive the latter, the magnetic force driving mechanism being mounted on a non-liquid-contacting portion of the casing at a position facing the impeller with respect to the direction of the rotary shaft axis of the impeller; and a fluid inlet passage for communicating between the suction port and the pumping chamber, the fluid inlet passage being formed to pass through the center portion of the magnetic force driving mechanism.

The second invention lies in an arrangement particularly suitable for a magnet pump of the kind in which the impeller is rotated on the basis of the principle of permanent magnet coupling the impeller having a permanent magnet embedded therein is rotatably driven by a magnetic force applied from the outside of the impeller, the pump comprising a pump casing including a suction port, a discharge port and a pumping chamber in which the impeller is contained; the impeller being rotatably contained in the pumping chamber of the casing and having the permanent magnet embedded therein; a pair of bearings, one being fixed to the casing and the other being fixed to the impeller; a magnetic force driving mechanism constituting a means for affording the magnetic force on the permanent magnet within the impeller to rotatably drive the latter, the magnetic force driving mechanism having a permanent magnet rotatably mounted on a non-liquid-contacting portion of the casing at a position facing the impeller with respect to the direction of the rotary shaft axis of the impeller; and a fluid inlet passage for communicating between the suction port and the pumping chamber, the fluid inlet passage being formed to pass through the center portion of the magnetic force driving mechanism.

Further, the third invention lies in an arrangement suitable for a magnet pump in which the impeller is adapted to be rotated under the action of an electromagnetic force, the impeller in which a permanent magnet is embedded is rotatably driven by a magnetic force applied from the outside of the impeller, the pump comprising a pump casing including a suction port, a discharge port and a pumping chamber in which the impeller is contained; the impeller being rotatably contained in the pumping chamber of the casing and having the permanent magnet embedded therein; a pair of bearings, one being fixed to the casing and the other being fixed to the impeller; a magnetic force driving mechanism constituting a means for affording the magnetic force on the permanent magnet within the impeller to rotatably drive the latter, the magnetic force driving mechanism comprises a stator fixed to a non-liquid-contacting portion of the casing at a position facing the impeller with respect to the direction of the rotary shaft axis of the impeller; and a fluid inlet passage for communicating between the suction port and the pumping chamber, the fluid inlet passage being formed to pass through the center portion of the magnetic force driving mechanism.

Furthermore, the fourth invention lies in an arrangement suitable for a magnet pump of the kind wherein the impeller is rotated on the basis of the principle of permanent magnet coupling, the impeller having a permanent magnet embedded therein is rotatably driven by a magnetic force from the outside of the impeller, similar to the second invention, and the pump comprises a pump casing including a suction port, a discharge port and a pumping chamber in which the impeller is contained; the impeller being rotatably contained in the pumping chamber of the casing and having the permanent magnet embedded therein; a pair of bearings, one being fixed to the casing and the other being fixed to the impeller; a magnetic force driving mechanism constituting a means for affording the magnetic force on the permanent magnet within the impeller to rotatably drive the latter, the magnetic force driving mechanism comprises a permanent magnet rotatably provided on a non-liquid-contacting portion of the casing at a position facing the impeller with respect to the direction of the rotary shaft axis of the impeller; a stator constituting a means for transmitting rotation to the magnetic force driving mechanism, the stator being fixed to a non-liquid-contacting portion of the magnetic force driving mechanism opposite to the impeller; and a fluid inlet passage for communicating between the suction port and the pumping chamber, the fluid inlet passage being formed to pass through the center portion of the magnetic force driving mechanism.

Since the invention is so constructed as stated above, the magnetic force for rotatingly driving the impeller embedded with the permanent magnet is given by the magnetic force driving mechanism which is positioned outside of the impeller at the suction port side of the pump casing. Thus, the axial component of the magnetic attraction force acting between the impeller and the magnetic force driving mechanism is a force which always urges the impeller towards the magnetic force driving mechanism. Also, the axial component of the force acting on the impeller which is created by the fluid pressure due to the rotation of the impeller, is also a force which always urges the impeller towards the suction port side, i.e. towards the magnetic force driving mechanism. Thus, regardless of what position the pump operating point is at, the direction of the axial force acting on the impeller is always the same, i.e. the direction in which the impeller is urged towards the magnetic force driving mechanism and, therefore, the pump has no unstable operating range.

Moreover, even if the fluid to be pumped contains air bubbles which cause a variation in pump outlet pressure, since both the magnetic attraction force and the thrust force caused by the fluid pressure acting on the impeller urge the impeller towards the magnetic force driving mechanism, there is no substantial shift of the impeller in the axial direction.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements and, of which.

DETAILED DESCRIPTION OF THE PREFERRED EMBODIMENTS:

Embodiments of the present invention will now be described with reference to the drawings.

Figure 1:
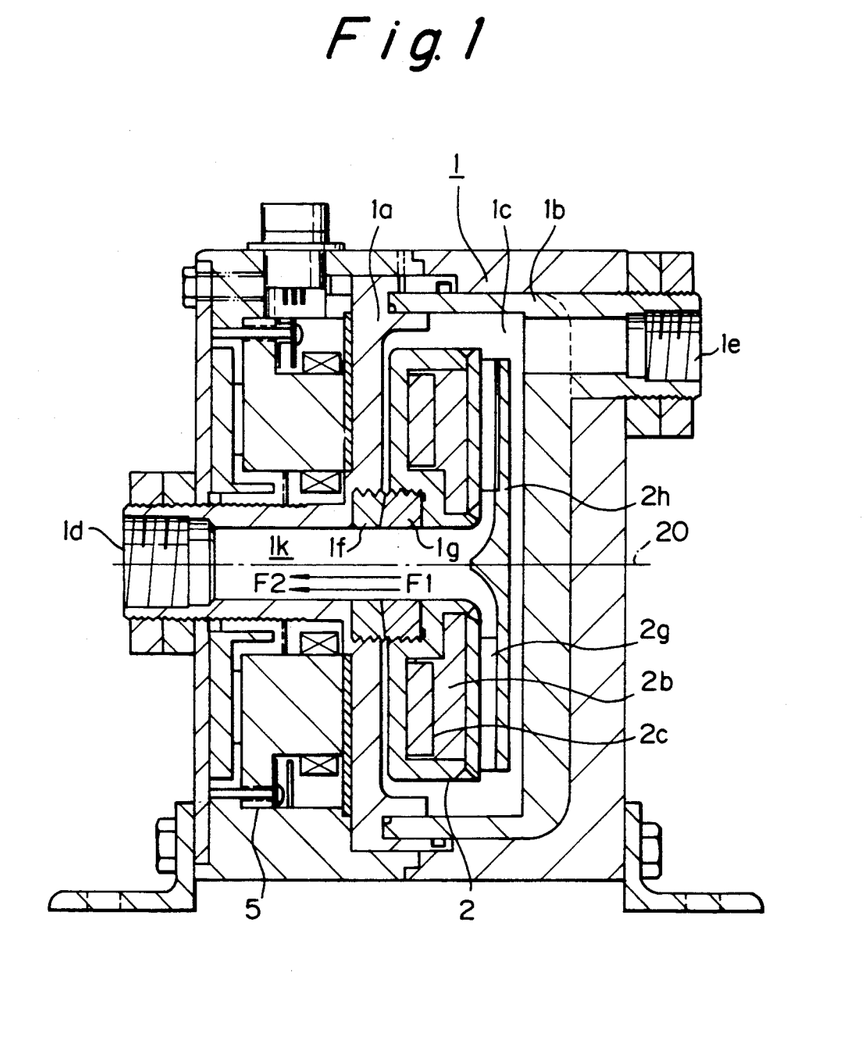
FIG. 1 is a vertical sectional view of an embodiment of the present invention.

FIG. 1 is a vertical sectional view of a first embodiment and also a third embodiment of the present invention, comprising a pump casing 1 including an inlet cover 1a having a suction port 1d for fluid and a back cover 1b having a discharge port 1e for pressurized fluid, the inlet and back covers 1a and 1b defining a pump chamber 1c containing an impeller 2, a rotating-part bearing 1g and a fixed-part bearing 1f respectively being provided on the impeller 2 and inlet cover 1a, and the pumping chamber 1c and the suction port 1d being in communication with each other through an inlet passage 1k. The material of those parts which constitute the casing 1 should have corrosion resistance to a delivery fluid. It is also desirable for at least the inlet cover 1a positioned in the magnetic field of a high flux density to be made of a non-magnetic material. The impeller 2 rotatably contained in the pumping chamber 1c has an annular permanent magnet 2c bonded to and embedded in a surface of an annularly formed magnet yoke 2b adjacent to the inlet cover 1a, which is usually sealed by a known means, such as thermal bonding or welding, using a non-magnetic material, such as nylon or fluorine plastic, to prevent the fluid from reaching the metallic portion. Furthermore, the impeller 2 is provided with vanes 2g for establishing the predetermined pump performance and which are attached with a main plate 2h for enhancing the pumping efficiency in the shown embodiment. Fixedly secured on or screwed into the inner surface or the portion facing the pumping chamber 1c, of the inlet cover 1a is the fixed-part bearing 1f the concave surface of which faces the side of the impeller 2, and the portion of the impeller 2 facing it in the direction of the axis 20 of the rotary shaft thereof is fixedly fitted with or screwed with the rotating-part bearing 1g, the convex surface of which corresponds to the concave surface of the fixed-part bearing 1f and faces it, and the thrust load in the direction of the axis 20 and the radial load perpendicular thereto are supported by the sliding contact of the bearings 1f and 1g. Located on the non-liquid-contacting portion of the inlet cover 1a is a stator 5 for serving as a magnetic force driving mechanism or means for rotatably driving the impeller under the action of magnetic force to the permanent magnet 2c embedded in the impeller 2, it being adapted to generate magnetic force by the power from a power supply not shown, and the fluid inlet passage 1k communicating between the suction port 1d and the pumping chamber 1c is formed in the center portion of the stator 5 along the rotary shaft axis 20 of the impeller 2. Thus, the fluid entering into the pump passes through the center portion of the magnetic force driving mechanism in the rotary shaft axis 20 of the impeller 2 and is pressurized by the action of the impeller 2 rotating within the pumping chamber 1c and directed there-through to the discharge port 1e and out to the exterior of the pump.

Figure 1A:
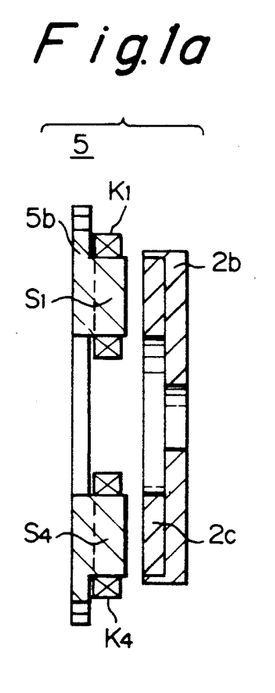
FIG. 1(a) is a schematic illustration of the essential part of FIG. 1.
Figure 1B:
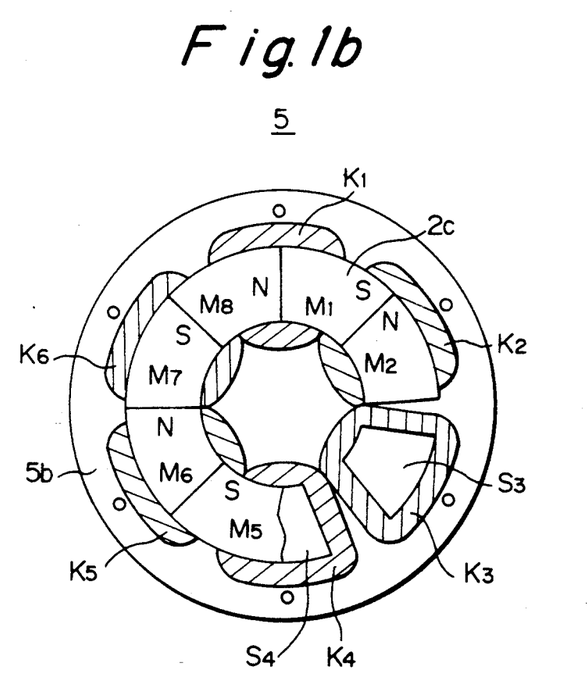
FIG. 1(b) is a plan view of the part of FIG. 1(a)

FIGS. 1(a) and (b) are schematic representations diagrammatically showing the power transmission of the magnet pump of the embodiment of FIG. 1, FIG. 1(a) being a vertical sectional view showing the stator 5 and the magnet yoke 2b and FIG. 1(b) being a side elevation as viewed from the right in FIG. 1(a) and the magnet yoke 2b being removed. A ring-shaped core 5b of a ferromagnetic material is provided with six projections S1–S6 formed on its side adjacent to the permanent magnet 2c, and coils k1–k6 are wound on the projections S1–S6, respectively. In this embodiment, the permanent magnet 2c includes eight segmented permanent magnets M1–M8 arranged in an annular array, each of the permanent magnets M1–M8 being premagnetized and located so that S-poles and N-poles are alternately positioned on the surface facing the stator 5. Although the permanent magnet 2c is divided into the segmented magnets M1–M8 to form one annular magnet, if necessary, a single magnet can be used by forming it into an annulus and magnetizing it to provide an alternating arrangement of S- and N-poles, and this is also true of permanent magnets 12, 22 and 32 which will be described below. The stator 5 is integrally formed together with the projections S1–S6 by laminating silicon steel plates or sintering iron powder, and a different number of poles, such as six poles in this embodiment, from those of the permanent magnet 2c (eight poles in this embodiment) is usually selected to ensure the staring operation and smooth rotation of the impeller 2.

The rotation of the permanent magnet 2c is caused by appropriately changing the supply of direct current to the coils k1–k6 in accordance with signals from a magnetic pole detecting means, such as a Hall effect element, not shown.

In this manner, the magnet pump of FIG. 1 is so operated that the impeller 2 is rotated by supplying power to the stator 5 to pressurize and deliver the fluid. At this time and if the impeller 2 is running at a rated speed of revolution, the fluid pressure acting on the impeller 2 will create a thrust force for urging the impeller 2 leftward as viewed in FIG. 1. On the other hand, the axial component of the force acting from the stator 5 on the impeller 2 always forces the impeller 2 leftward, so that the impeller 2 can continue the operation in a stable position without changing its position at any operating point.

In addition to the magnetic force of the stator 5 and the fluid force pressurized by the pump, furthermore, the impeller 2 is subjected to the gravity and the fluid force acting between the bearings 1f and 1g. The gravity has practically no effect, although the direction of the gravitational action varies depending upon the horizontal or vertical positioning of the magnet pump of FIG. 1. Therefore, the effect of the gravity thereon is not further described herein. The magnitude of the fluid pressure on the bearings is also not described because if the bearings are operating normally a reaction equal to the load applied thereto is being created.

The following effects and obtained in the aforementioned embodiment.

(A) The direction of the axial component of the magnetically attracting force acting between the permanent magnet 2c embedded in the impeller 2 and the magnetic force driving mechanism 5 is always the direction to urge the impeller 2 towards the magnetic force driving mechanism 5, and the direction of the fluid force acting on the impeller created by the rotation of the impeller is also always the direction to urge the impeller towards the magnetic force driving mechanism, so that even if the pump operating point is at any position the impeller is rotated in a stable position with respect to the axial direction, and thus no impact load is applied to the bearing and the bearing is prevented from being damaged.

Moreover, there is caused no such hysteresis phenomenon on the pump pressure-flow rate characteristic curve, as caused in the conventional magnet pumps.

(B) Even if the fluid to be pumped contains air bubbles which cause a fluctuation in pump outlet pressure, the impeller can always be rotated at a stable position and abnormal vibration is suppressed, because no hysteresis phenomenon exists on the pump pressure-flow rate characteristic curve.

(C) Since the impeller rotates while it is urged towards the magnetic force driving mechanism, the magnetic gap between the magnetic force driving mechanism and the impeller is held as small as possible. Accordingly, the force for rotating the impeller is always at a maximum value to allow the pump performance to be maximized.

(D) Since the impeller is always running while being magnetically attracted to the magnetic force driving mechanism, only a pair of bearings 1f, 1g for supporting the loads may economically be provided between the impeller 2 and the casing 1a of the magnetic force driving mechanism.

(E) Since no hysteresis is on the pump pressure-flow rate characteristic curve, no offset contact phenomenon is caused on the sliding surfaces of the bearing and possible occurrence of damage thereto can substantially be avoided.

(F) Since the stator is used for the magnetic force driving mechanism, the only moving part of this magnet pump is the impeller thereof and the remaining parts are stationary, so that no particles are expelled to the exterior and no application of oil is necessary, thus enabling the pump to be used in an environment which must remain free from contamination.

(G) The magnet pump can be extremely compact in form.

(H) Since the fluid inlet passage is formed to pass through the center portion of the bearing fixed in the pump casing, the bearing is positioned between the impeller and the magnetic force driving mechanism in the direction of rotary shaft axis of the impeller and supports the impeller thereat. Thus, every forces acting on the impeller such as a magnetic attraction force F1, an impeller thrust force F2, a radial force and a gravity acting on the impeller are supported near the point of application or center of the impeller and, therefore, effective load bearing may be effected.

Figure 2:
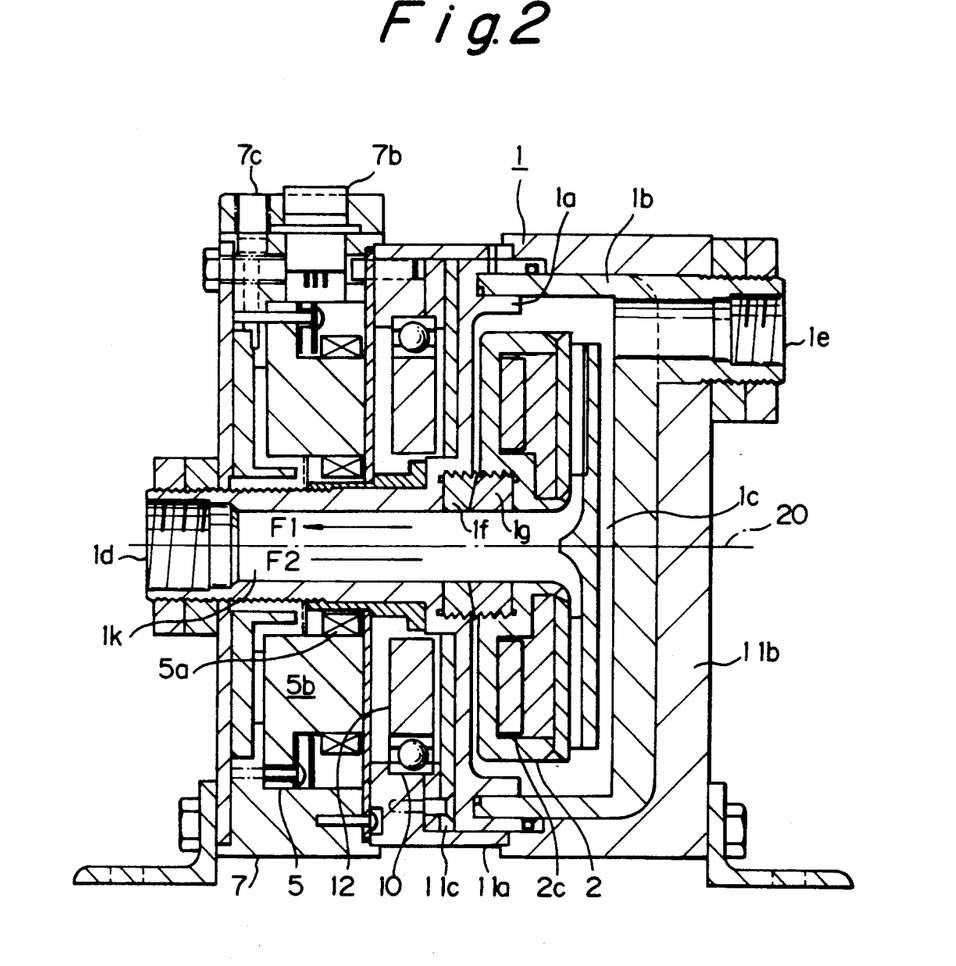
FIG. 2 is a vertical sectional view of another embodiment of the invention.

FIG. 2 shows the second inventive embodiment and the fourth inventive embodiment described below, the magnetic force driving mechanism thereof having a different structure from that of the aforementioned embodiments. In the second embodiment, there is provided a permanent magnet for the magnetic force driving mechanism constituting the means for rotatably driving the impeller 2 embedding the permanent magnet under the action of an exterior magnetic force, the permanent magnet is rotatably mounted in the non-liquid-contacting portion of the casing so that the magnetic force thereof directly acts on the permanent magnet embedded in the impeller 2 to rotatably drive the latter. The following description is an outline of this embodiment with the common parts to those shown in FIG. 1 not being described in further detail.

As shown in FIG. 2, in this embodiment, the casing 1 having the suction port 1d, the discharge port 1e and the pumping chamber 1c includes the inlet cover 1a and the back cover 1b, and the impeller 2 is contained in the pumping chamber 1c. The outside of the casing 1 is reinforced by a back casing cover 11b, an inlet casing cover 11a, and a reinforcing plate 11c secured to the inlet casing cover 11a. A ball bearing 10 is secured to the inner periphery of the inlet casing cover 11a positioned on the non-liquid-contacting portion of the casing 1, and an annular permanent magnet 12 is secured to the inner race of the bearing. Thus, the annular permanent magnet 12 or magnetic force driving mechanism for rotatably driving the impeller 2 is rotatably provided in the non-liquid-contacting portion.

Figure 2A:
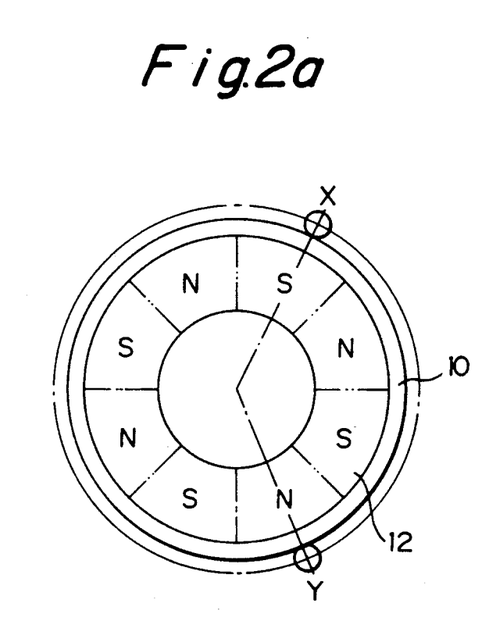
FIG. 2(a) is a schematic illustration showing the arrangement of the magnet of FIG. 2.
Figure 2B:
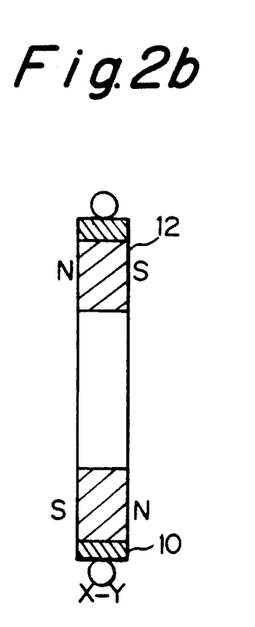
FIG. 2(b) is a sectional view taken along line X-Y of FIG. 2(a)

The permanent magnet 12 is basically in magnetical and mutual attraction with the permanent magnet 2c embedded in the impeller 2. Since the permanent magnet 12 of the magnetic force driving mechanism also has the alternate pole arrangement as shown in FIG. 2(a), similar to the permanent magnet 2 of the impeller 2, as the permanent magnet 12 of the magnetic force driving mechanism rotates the impeller 2 is also rotated in synchronism therewith. The permanent magnet 12 of the magnetic force driving mechanism not only directly rotatably drives the impeller 2, but also receives the magnetic action for rotating itself from the stator 5. Thus, the magnetization of the permanent magnet 12 is so made that the axially aligned poles on the opposite surfaces of the annular permanent magnet 12 have opposite polarities to each other as shown in FIGS. 2(a) and (b). In this manner, the permanent magnet 12 has the function of a driving source relative to the impeller 2 and also a function of the driven member relative to the stator 5. Although the permanent magnet 12 is shown in the form of an integral ring-shaped magnet, it may be formed by arranging a plurality of divided permanent magnets in an annulus in which the N- and S-poles are alternately positioned.

In the FIG. 2 embodiment, furthermore, the inlet passage 1k for communicating between the pumping chamber 1c and the suction port 1d passes through the center portions of the stator 5 and permanent magnet 12 of the magnetic force driving mechanism along the axis 20 of the impeller 2. In this invention, however, the means for rotating the magnetic force driving mechanism may, for example, be constituted by a turbine or motor which is arranged to rotate the permanent magnet 12 through gears, and there is no need for such a turbine or motor to be arranged on the same axis as that of the magnetic force driving mechanism.

In this embodiment too, both of the magnetic attraction force F1 acting on the impeller 2 and the thrust force F1 due to the fluid pressure act to urge the impeller 2 towards the magnetic force driving mechanism and the load is supported on the sliding surfaces between the rotating-part bearing 1g secured to the impeller 2 and the fixed-part bearing 1f facing thereto and fixed to the inlet cover 1a, and the impeller 2 can be rotated in a stable position similar to that of the embodiment of FIG. 1. The pump shown further comprises a motor cover 7 for containing the stator 5, a connector 7b for receiving power from the power supply not shown and an air supply port 7c for supplying cooling air to portions of the stator 5.

The following effects can be obtained in the second embodiment.

Since the magnetic force driving mechanism for rotatably driving the impeller 2 is the permanent magnet, the magnetic attraction force acting on the impeller also has a centralizing function for holding the impeller in a constant position in a direction perpendicular to the rotary shaft axis, so that the impeller can be held in an appropriate position by the centralizing function due to the magnetic force, even when there is no specific shaft for holding it in a predetermined radial position.

Figure 3:
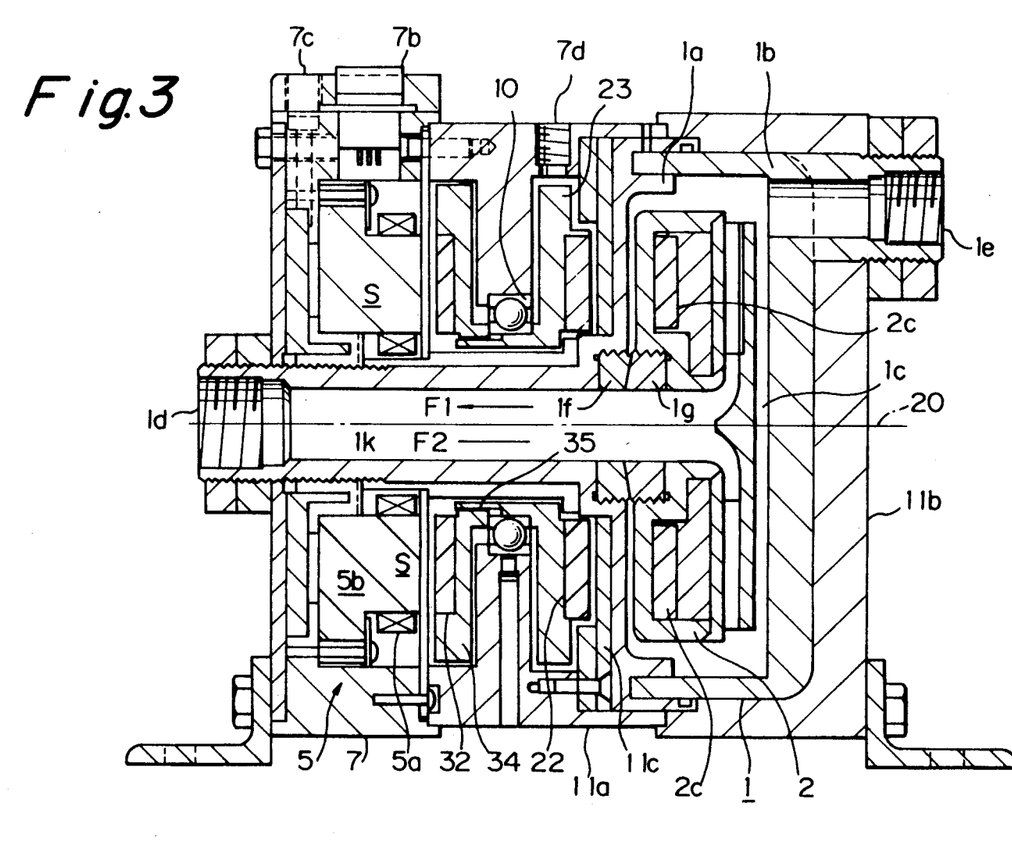
FIG. 3 is a vertical sectional view showing a further embodiment of the invention.
Figure 4A:
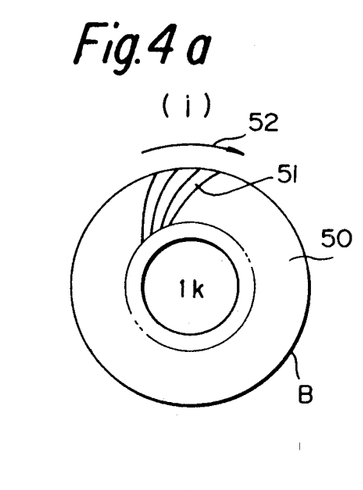
FIGS. 4(a)-(f) respectively are schematic illustration showing an embodiment of the bearing of the invention.
Figure 4B:
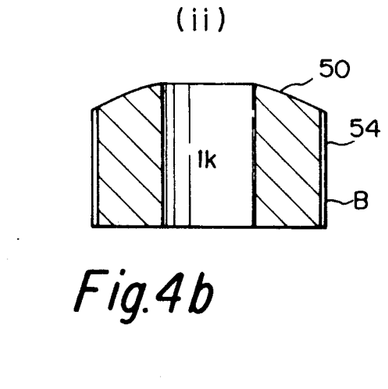
Figure 4C:
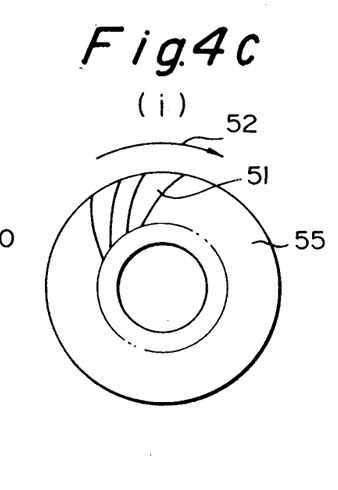
Figures 4D, 4F:
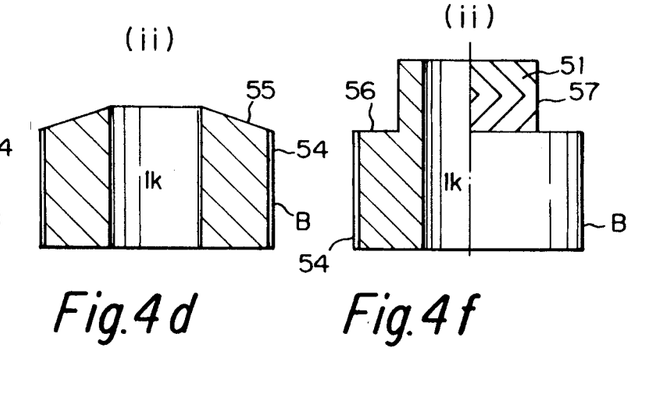
Figure 4E:
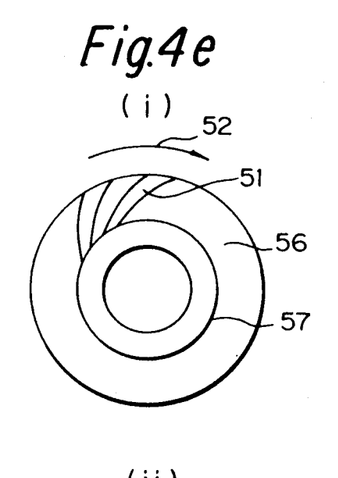

FIG. 3 shows an embodiment of the fourth invention which has a different structure of the magnetic force driving mechanism from that of the embodiment of FIG. 1. Thus, the difference will mainly be described below.

In FIG. 3, the casing 1 having the suction port 1d, the discharge port 1e and the pumping chamber 1c includes the inlet cover 1a and the back cover 1b, and the impeller 2 is rotatably contained in the pumping chamber 1c. The outside of the casing 1 is reinforced by a back casing cover 11b, an inlet casing cover 11a, and a reinforcing plate 11c secured to the inlet casing cover 11a. A ball bearing 10 is secured to the inner periphery of the inlet casing cover 11a positioned on the non-liquid-contacting portion of the casing 1, and a magnet yoke 23 attached with a permanent magnet 22 of the magnetic force driving mechanism is secured to the inner race of the bearing. A magnet yoke 34 attached with a driven-side permanent magnet 32 for receiving the magnetic force from the stator 5 is secured at a screw-threaded portion 35 to an opposite side of the magnet yoke 23 to the impeller 2 so that the permanent magnet 22 of the magnetic force driving mechanism and the driven-side permanent magnet 32 are rotated together with each other.

The stator 5 for rotating the driven-side permanent magnet 32 is fixedly contained in the motor cover 7 integrally connected with the inlet casing cover 11a positioned in the non-liquid-contacting portion of the casing 1, and a projection S of the core 5b of the stator 5 is opposed to the driven-side permanent magnet 32. When power from the power supply not shown is supplied through the connector 7b to the coil 5a, a magnetic field is created on the projection S of the core 5b to rotate the driven-side permanent magnet 32 opposed to and spaced away from the projection S in the direction of the rotary shaft axis 20 thereof, and the magnet yoke 23 for the magnetic force driving mechanism rotatably supported together with the driven-side magnet yoke 34 is also rotated together with the driven-side magnet yoke 34. Thus, the permanent magnet 22 of the magnetic force driving mechanism is rotated to create a magnetic driving force for rotating the impeller 2. In this embodiment of FIG. 3, it is preferable for the permanent magnet 2c embedded in the impeller 2 and the permanent magnet 22 of the magnetic force driving mechanism to be provided with the same number of poles and the permanent magnet 32 to also be provided with an appropriate number of alternately polarized poles to provide an optimum power transmission in relation to the stator 5.

In this manner, in the embodiment of FIG. 3 the permanent magnet is provided in the magnetic force driving mechanism for directly rotatably driving the permanent magnet embedded in the impeller 2, and the stator is provided as a means for rotating the magnetic force driving mechanism, and the inlet passage 1k for communicating between the suction port and the pumping chamber 1c is formed in their center portion, i.e., along the rotary shaft axis of the impeller 2.

In this case too, the thrust force F2 due to the fluid pressure acting on the impeller 2 and the axial component F1 of the magnetic attraction both act in the direction to urge the impeller 2 towards the magnetic force driving mechanism, and the load is supported on the sliding surfaces between the rotating-part bearing 1g and the fixed-part bearing 1f fixed to the inlet cover 1a and opposed thereto, so that the impeller 2 can be rotated in the stable position similarly in the embodiments shown in FIGS. 1 and 2.

In this embodiment, further, the power transmission between the magnetic force driving mechanism and the impeller 2 utilizes the same principle of permanent magnet coupling as that of the second embodiment and thus the power loss in the course of transmitting the power (magnetic force) is almost negligible as long as the material for the inlet cover 1a and reinforcing plate 11c is appropriately selected. Both of the magnetic force driving mechanism and the stator 5 functioning as the means for rotating it are at the non-liquid-contacting portion. In general, the energy conversion involving the stator 5 from electric power to the rotary torque is a process which involves a considerable energy loss usually resulting from the magnetic gap. In this embodiment, however, as is clear from the FIG. 3, the structure for generating the rotary torque in the stator 5 is positioned in the non-liquid-contacting portion, whereby the magnetic gap can be minimized to make the magnetic pump highly effective.

The pump shown also has the motor cover 7 for containing the stator 5, the connector 7b for receiving power from the power supply not shown, the air supply port 7c for supplying cooling air to portions of the stator 5 and the discharge port 7d of the cooling air.

In the embodiment shown in FIG. 3, the following effects can be obtained in addition to the effects above stated regarding the embodiment of the second invention.

The magnetic force driving mechanism has the magnet for applying magnetic force to the impeller for rotation, and there is almost no power loss during the power transmission between the impeller and the magnetic force driving mechanism, if the material of the casing and its reinforcing members interposed between the impeller and magnetic force driving mechanism is appropriately selected, irrespective of the output of the magnet pump and the dimension of the magnetic gap with the result that no heat is generated in the course of the power transmission. Also the magnetic force driving mechanism and the stator for rotating it are located in the non-liquid-contacting portion so that highly efficient power transmission (energy conversion) can be achieved, thus, any heat generation due to the power loss can be avoided, and a highly efficient magnet pump can be provided.

Figure 5:
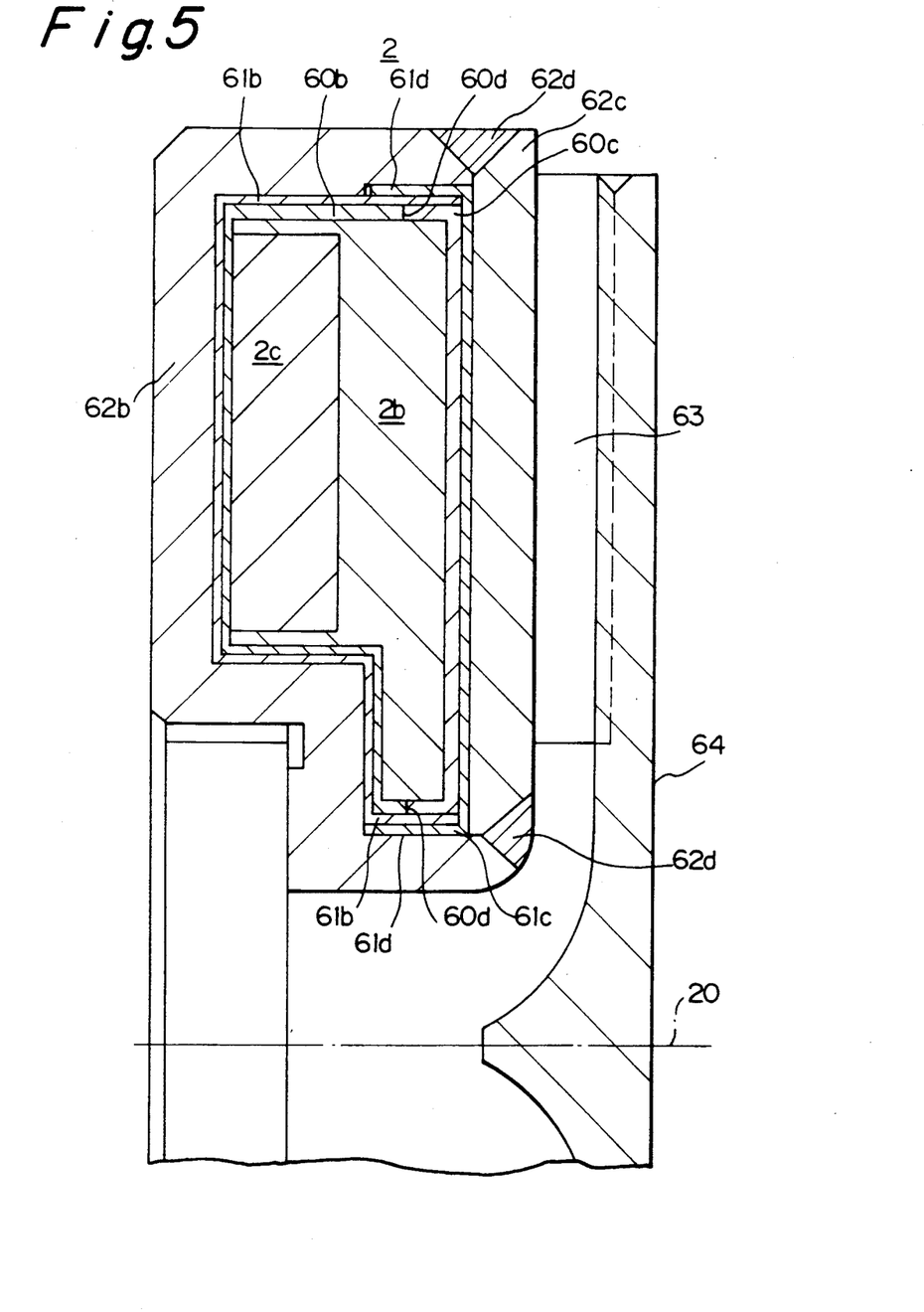
FIG. 5 is a vertical sectional view showing the essential part of an embodiment of the impeller of the invention.

FIGS. 4 and 5 are to explain the components of the preferred embodiment of the magnet pump of the present invention, FIG. 4 being for the bearing and FIG. 5 being for the impeller.

FIG. 4 (a-f) schematically shows a bearing suitable for use with the magnet pump of the present invention. In the magnet pump of the invention, the bearing is desirably constituted by a dynamic pressure bearing of own-liquid lubricating system using the fluid in the pumping chamber 1c for lubricant, and most preferably a spirally grooved bearing formed with grooves of about 10 microns in depth in one of the sliding surfaces, in view of the large load capacity. The bearing material is preferably a ceramic which is a brittle material not easily deformable, and usually may be a ceramic sintered material, such as a silicon carbide sintered material, a silicon nitride sintered material, an aluminum oxide sintered material. When used with strongly active chemicals, a thin layer of a highly pure ceramic should be formed the entire surface of the ceramic sintered material. In particular, a spirally grooved bearing produced by forming a layer about 100 to 200 micron thick of silicon carbide on the surface of a silicon carbide sintered material by a thermal CVD process and then forming spiral grooves in the surface of the CVD layer has excellent corrosion and wear resistance, and the physical property of the substrate of silicon carbide sintered material and the thin layer of silicon carbide formed thereon is analogous which provides a high mutual bonding strength and high thermal and physical shock resistances and high reliability. The below-described bearings can be formed of the above-described materials and are basically self-lubricating type dynamic pressure bearings. FIG. 4 (a-b) only show the rotating-part bearing of the spherical surface type dynamic pressure bearing shown in respect of the aforementioned embodiment and the sliding surface 50 has a spherical configuration and is formed with spiral grooves 51 therein. On the other hand, the surface of the fixed-part bearing not shown has a complementarily concaved spherical configuration. An arrow shows the direction of rotation the bearing B, and as the bearing rotates in that direction of rigid fluid film is formed on the sliding surface 50 to provide a balance in response to the load. Due to the spherical shape, the cliding surface 50 can support both the thrust and radial loads.

FIG. 4 (c-d) show the rotating-part bearing of a conical, spirally grooved bearing, and the sliding surface of the fixed-part bearing not shown has a complementarily concaved surface. As the rotating-part bearing rotates in the direction of the arrow 52, the conical, spirally grooved bearing can also support the thrust and radial loads. Particularly, it secures the position of the impeller 2 more positively.

FIG. 4 (e) show the rotating-part of a quill type spirally grooved bearing described in the prior art and which has a flat spirally grooved bearing portion 56 for supporting the thrust force and a cylindrical spirally grooved bearing portion 57 for supporting the radial force. It is also necessary that the sliding surface of the fixed-part bearing should be complementary to the sliding surfaces 56, 57 of the rotating-part bearing.

In the spirally grooved bearings, furthermore, the spiral grooves may be provided either on the sliding surface of the rotating-part or fixed-part bearing, and the rotating-part bearings of FIGS. 4 (a-f), can also be attached to the fixed-parts.

FIG. 5 is a sectional view of the essential part of the impeller 2, and the iron magnet yoke 2b and the permanent magnet 2c fixed thereto are both of a easily corrosive material. Thus, they are not only sealed by an organic polymer material (nylon, PTFE, PFA, etc.), but also covered by a highly air-tight inorganic material to enhance the corrosion resistance of the metallic material. Upper and lower stream side covers 60b and 60c are made of a good corrosion-resisting resin, such as PFA, the magnet yoke 2b and permanent magnet 2c being contained in the upper and lower stream side covers 60b and 60c, their joined surface 60d is welded to embed the metal parts therein, these being further contained in ceramic containers 61b, 61c the outermost periphery of which is covered with upper and lower stream side impellers 62b and 62c made of PTFE, and their joined surface 62d being welded to seal the rotor portion. Blades 63 for pressurizing the fluid are integrally performed with the lower stream side impeller 62c and a main shroud 64 is welded to the blades 63. With this arrangement, even if fluid which is in a gaseous or liquid state tends to penetrate through the outer peripheral PTFE impellers 62b, 62c, such fluid penetration is prevented by the containers 61b, 61c of inorganic material to protect the permanent magnet 2c and magnet yoke 2b. The containers 61b, 61c shown in FIG. 5 are arranged thin films of silicon carbide produced by a thermal CVD process and so their joined portion 61d is sealed by an interposed thin film of PFA.

With such an arrangement, even in the case that the pump is used to deliver a highly penetrable and corrosive fluid, such as hydrofluoric acid, for example, the metal parts embedded in the impeller 2 suffer virtually no corrosion even over long periods of time.

If the fluid to be pumped does not attack quartz, such as sulfuric acid, nitric acid or hydrochloric acid, the containers 61b, 61c may be formed of quartz and the joined surface 61d can be welded by a known means, such as by a laser, to provide a complete seal.

The containers can also be prevented from being damaged by the aforementioned interposition of the upper and lower stream side covers 60b and 60c of a resilient material between the metal members, such as the permanent magnet 2c and the magnet yoke 2b, and the brittle containers 61b, 61c.

Furthermore, if the aforementioned containers are formed of a glass material, such as quartz, and the joined surface is completely sealed by welding or thermal bonding means, there will be no need to sealingly encapsulate the metal members as in the case of the upper and lower stream side cover 60b and 60c, but only provide shock absorbing ability to avoid point contact of the metal members and containers.

The above description in respect of FIGS. 4 and 5 is commonly applicable to any of the magnet pumps of the present invention.

By adopting the arrangements shown in FIGS. 4 and 5, the following effects can be obtained.

(A) The spirally grooved bearing of sintered silicon carbide material coated with a thin layer of silicon carbide by a thermal CVD process causes no elution of the components to almost all kinds of fluid in the temperature range of lower than 200° C., and thus the pump is suitable for use in pumping chemicals of extremely high purity.

(B) Since the metal members, such as the magnet contained in the impeller 2 and the magnet yoke, are contained in the inorganic containers, the penetration of a corrosive component of the fluid can be effectively blocked or minimized to prolong the pump life, and the possibility of expelling rust produced by metal members into a fluid can be minimized.

What is claimed is:

1. A magnet pump, comprising:
   a closed type impeller having a first portion with a permanent magnet embedded therein, a plurality of vanes attached to said first portion, and a main plate attached to said vanes, said impeller being rotatably driven by a magnetic force from the outside of said impeller, said permanent magnet being disk shaped and oriented perpendicular to a rotational axis of said impeller;
   a pump casing including a suction port, a discharge port and a pumping chamber in which the impeller is contained, the impeller being rotatably contained in said pumping chamber of said casing and having the permanent magnet embedded therein;
   a bearing provided on the suction side of the impeller and having a stationary part fixed to said casing and a moving part fixed to said impeller, an outer diameter of said bearing being smaller than an inner diameter of said permanent magnet embedded in said impeller, said bearing being shaped to support radial force and thrust force acting on said impeller;
   a magnetic force driving mechanism constituting a means for affording the magnetic force on said permanent magnet within said impeller to rotatably drive the latter, said magnetic force driving mechanism being mounted on a non-liquid-contacting portion of said casing on a suction side of said impeller and facing said impeller in respect to the direction of the rotary shaft axis of said impeller; and
   a fluid inlet passage for communicating between said suction port and said pumping chamber, said fluid inlet passage being formed to pass through the center portion of said magnetic force driving mechanism and the center of the bearing as defined by the rotational axis of the impeller.

2. A magnet pump as set forth in claim 1, wherein the permanent magnet embedded in said impeller is contained in a container made of an inorganic material.

3. A magnet pump as set forth in any one of claims 1 or 2, wherein the material of said bearing is ceramic, and said bearing is formed in its sliding surface with grooves for generating dynamic pressure.

4. A magnet pump as set forth in claim 3, wherein said ceramic includes a substrate of silicon carbide sintered material and a thin layer of silicon carbide coated on the surface of the substrate by a thermal CVD process.

5. A magnet pump, comprising:
   a closed type impeller having a first portion with a permanent magnet embedded therein, a plurality of vanes attached to said first portion, and a main plate attached to said vanes, said impeller being rotatably driven by a magnetic force from the outside of said impeller, said permanent magnet being shaped and oriented perpendicular to a rotational axis of said impeller;
   a pump casing including a suction port, a discharge port and a pumping chamber in which the impeller is contained, the impeller being rotatably contained in said pumping chamber of said casing and having the permanent magnet embedded therein;
   a bearing provided on the suction side of the impeller and having a stationary part fixed to said casing and a moving part fixed to said impeller, an outer diameter of said bearing being smaller than an inner diameter of said permanent magnet embedded in said impeller, said bearing being shaped to support radial force and thrust force acting on said impeller;
   a magnetic force driving mechanism constituting a means for affording the magnetic force on said permanent magnet within said impeller to rotatably drive the latter, said magnetic force driving mechanism having a permanent magnet which is rotatable about said axis of said impeller and is mounted on a non-liquid-contacting portion of said casing on a suction side of said impeller, said permanent magnet of said magnetic force driving mechanism facing said impeller with respect to the direction of the rotary shaft axis of said impeller; and a fluid inlet passage for communicating between said suction port and said pumping chamber, said fluid inlet passage being formed to pass through the center portion of said magnetic force driving mechanism and the center of the bearing as defined by the rotational axis of the impeller.

6. A magnet pump as set forth in claim 5, wherein the permanent magnet embedded in said impeller is contained in a container made of an inorganic material.

7. A magnet pump as set forth in any one of claims 5 or 6, wherein the material of said bearing is ceramic, and said bearing is formed in its sliding surface with grooves for generating dynamic pressure.

8. A magnet pump as set forth in claim 7, wherein said ceramic includes a substrate of silicon carbide sintered material and a thin layer of silicon carbide coated on the surface of the substrate by a thermal CVD process.

9. A magnet pump, comprising:

a closed type impeller having a first portion with a permanent magnet embedded therein, a plurality of vanes attached to said first portion, and a main plate attached to said vanes, said impeller being rotatably driven by a magnetic force from the outside of said impeller, said permanent magnet being disk shaped and oriented perpendicular to a rotational axis of said impeller;

a pump casing including a suction port, a discharge port and a pumping chamber in which the impeller is contained, the impeller being rotatably contained in said pumping chamber of said casing and having the permanent magnet embedded therein;

a bearing provided on the suction side of the impeller and having a stationary part fixed to said casing and a moving part fixed to said impeller, an outer diameter of said bearing being smaller than an inner diameter of said permanent magnet embedded in said impeller, said bearing being shaped to support radial force and thrust force acting on said impeller;

a magnetic force driving mechanism constituting a means for affording the magnetic force on said permanent magnet within said impeller to rotatably drive the latter, said magnetic force driving mechanism having a stator fixed to a non-liquid-contacting portion of said casing on a suction side of said impeller and facing said impeller with respect to the direction of the rotary shaft axis of said impeller; and a fluid inlet passage for communicating between said suction port and said pumping chamber, said fluid inlet passage being formed to pass through the center portion of said magnetic force driving mechanism and the center of the bearing as defined by the rotational axis of the impeller.

10. A magnet pump as set forth in claim 9, wherein the permanent magnet embedded in said impeller is contained in a container made of an inorganic material.

11. A magnet pump as set forth in any one of claims 9 or 10, wherein the material of said bearing is ceramic, and said bearing is formed in its sliding surface with grooves for generating dynamic pressure.

12. A magnet pump as set forth in claim 11, wherein said ceramic includes a substrate of silicon carbide sintered material and a thin layer of silicon carbide coated on the surface of the substrate by a thermal CVD process.

13. A magnet pump, comprising:

a closed type impeller having a first portion with a permanent magnet embedded therein, a plurality of vanes attached to said first portion, and a main plate attached to said vanes, said impeller being rotatably driven by a magnetic force from the outside of said impeller, said permanent magnet being disk shaped and oriented perpendicular to a rotational axis of said impeller;

a pump casing including a suction port, a discharge port and a pumping chamber in which the impeller is contained, the impeller being rotatably contained in said pumping chamber of said casing and having the permanent magnet embedded therein;

a bearing provided on the suction side of the impeller and having a stationary part fixed to said casing and a moving part fixed to said impeller, an outer diameter of said bearing smaller than an inner diameter of said permanent magnet embedded in said impeller, said bearing being shaped to support radial, force and thrust force acting on said impeller;

a magnetic force driving mechanism constituting a means for affording the magnetic force on said permanent magnet within said impeller to rotatably drive the latter, said magnetic force driving mechanism having a permanent magnet which is rotatable about said axis of said impeller and which is mounted on a non-liquid-contacting portion of said casing on a suction side of said impeller, said permanent magnet of said magnetic force driving mechanism facing said impeller with respect to the direction of the rotary shaft axis of said impeller;

a stator being fixed to a non-liquid-contacting portion of said magnetic force driving mechanism opposite to said permanent magnet of the magnet force driving mechanism; and a fluid inlet passage for communicating between said suction port and said pumping chamber, said fluid inlet passage being formed to pass through the center portion of said magnetic force driving mechanism and the center of the bearing as defined by the rotational axis of the impeller.

14. A magnet pump as set forth in claim 13, wherein the permanent magnet embedded in said impeller is contained in a container made of an inorganic material.

15. A magnet pump as set forth in any one of claims 13 or 14, wherein the material of said bearing is ceramic, and said bearing is formed in its sliding surface with grooves for generating dynamic pressure.

16. A magnet pump as set forth in claim 15, wherein said ceramic includes a substrate of silicon carbide sintered material and a thin layer of silicon carbide coated on the surface of the substrate by a thermal CVD process.

* * * * *